United States Patent
Rao et al.

(10) Patent No.: US 10,686,665 B2
(45) Date of Patent: Jun. 16, 2020

(54) DISCOVERY AND CONFIGURATION OF AN OPEN NETWORKING ADAPTER IN A FABRIC NETWORK

(71) Applicant: Avaya Inc., Santa Clara, CA (US)

(72) Inventors: Seetharam V. Rao, Bangalore (IN); Prashantkumar Sthavarmath, Shahapur (IN); Prashanth Kumar, Bangalore (IN); Sunil Menon, Los Gatos, CA (US); Seung Bong Han, Tracy, CA (US)

(73) Assignee: Avaya Inc., Santa Clara, CA (US)

( * ) Notice: Subject to any disclaimer, the term of this patent is extended or adjusted under 35 U.S.C. 154(b) by 175 days.

(21) Appl. No.: 15/675,572

(22) Filed: Aug. 11, 2017

(65) Prior Publication Data

US 2019/0052533 A1    Feb. 14, 2019

(51) Int. Cl.
*H04L 12/14* (2006.01)
*H04L 12/24* (2006.01)
*H04L 29/08* (2006.01)

(52) U.S. Cl.
CPC .......... *H04L 41/12* (2013.01); *H04L 41/0806* (2013.01); *H04L 41/0213* (2013.01); *H04L 67/12* (2013.01); *H04L 67/30* (2013.01)

(58) Field of Classification Search
CPC ......... H04L 41/12; H04L 67/30; H04L 67/12; H04L 41/0806; H04L 41/2013
See application file for complete search history.

(56) References Cited

U.S. PATENT DOCUMENTS

| | | | | |
|---|---|---|---|---|
| 7,496,052 | B2 * | 2/2009 | Jain | H04L 12/4641 370/254 |
| 2012/0294192 | A1 * | 11/2012 | Masood | H04L 12/4645 370/255 |
| 2013/0339187 | A1 * | 12/2013 | Carter | G06Q 20/102 705/26.41 |
| 2014/0211661 | A1 * | 7/2014 | Gorkemli | H04L 41/12 370/255 |
| 2015/0071289 | A1 * | 3/2015 | Shin | H04L 45/745 370/392 |
| 2016/0254984 | A1 * | 9/2016 | Tekalp | H04L 45/02 709/242 |
| 2016/0294732 | A1 * | 10/2016 | Chou | H04L 49/25 |
| 2016/0359721 | A1 * | 12/2016 | Hu | H04L 41/12 |
| 2017/0078183 | A1 * | 3/2017 | Civanlar | H04L 45/02 |
| 2017/0111223 | A1 * | 4/2017 | Matni | H04L 41/0823 |
| 2017/0195255 | A1 * | 7/2017 | Pham | H04L 49/25 |
| 2017/0244611 | A1 * | 8/2017 | Wang | H04L 12/1435 |
| 2017/0279884 | A1 * | 9/2017 | Yang | H04L 61/103 |
| 2017/0289944 | A1 * | 10/2017 | Krajewski | H04L 45/122 |
| 2017/0302501 | A1 * | 10/2017 | Shi | H04L 29/12009 |

(Continued)

*Primary Examiner* — Oanh Duong

(57) ABSTRACT

Implementations generally relate methods, systems, and computer readable media for discovery of an open network adapter. In some implementations, a method includes receiving, by a software-defined network (SDN) controller, a notification of an open networking adapter (ONA) establishing a connection with a switch, the ONA having an address associated therewith. The method further includes identifying the switch based on a lookup of the address of the ONA in forwarding tables of a neighboring switch of the SDN controller. The method further includes applying a service profile configuration to a port of the switch where the ONA is connected.

20 Claims, 4 Drawing Sheets

(56) References Cited

U.S. PATENT DOCUMENTS

2017/0310574 A1* 10/2017 Wolting .................. H04L 45/02
2018/0048593 A1*  2/2018 Tian .................... H04L 41/0813
2018/0288126 A1* 10/2018 Smart .................... H04L 69/22
2018/0343319 A1* 11/2018 Kutty .................. H04L 41/0886
2018/0367431 A1* 12/2018 Lai ...................... H04L 43/0876

* cited by examiner

DISCOVERY AND CONFIGURATION OF AN OPEN NETWORKING ADAPTER IN A FABRIC NETWORK

BACKGROUND

Open networking adapters (ONA) may be used to couple devices, such as an Internet-of-Things (IoT) device to a network, e.g., a home network, a business network (e.g., at a medical facility). Upon initial introduction to the network, a device such as a medical device may connect to a switch. Furthermore, the device may move from one switch to another switch (e.g., when physically moved within the medical facility).

SUMMARY

Implementations generally relate methods, systems, and computer-readable media for discovery of an open network adapter. In some implementations, a computer-implemented method includes receiving, by a software-defined network (SDN) controller, a notification of an open networking adapter (ONA) establishing a connection with a switch, the ONA having an address associated therewith. The method further includes identifying the switch based on a lookup of the address of the ONA in forwarding tables of a neighboring switch of the SDN controller. The method further includes applying a service profile configuration to a port of the switch where the ONA is connected.

With further regard to the method, in some implementations, the identifying of the switch is performed two or more times. In some implementations, the method further includes searching a lookup table in a topology table of the switch. In some implementations, the ONA is part of an Internet-of-Things (IoT) device. In some implementations, the ONA is part of a fabric attach-capable device coupled to a medical device. In some implementations, the forwarding tables include information associated with a plurality of fabric attach-capable devices. In some implementations, the method further includes detecting the ONA being disconnected from a different switch.

In some implementations, a system includes one or more processors coupled to a non-transitory computer-readable medium with program instructions stored thereon. When executed by the one or more processors, the instructions cause the one or more processors to perform operations including receiving, by an SDN controller, a notification of an ONA establishing a connection with a switch, the ONA having an address associated therewith; identifying the switch based on a lookup of the address of the ONA in forwarding tables of a neighboring switch of the SDN controller; and applying a service profile configuration to a port of the switch where the ONA is connected.

With further regard to the system, in some implementations, the identifying of the switch is performed two or more times. In some implementations, the instructions further cause the one or more processors to perform operations including searching a lookup table in a topology table of the switch. In some implementations, the ONA is part of an IoT device. In some implementations, the ONA is part of a fabric attach-capable device coupled to a medical device. In some implementations, the forwarding tables include information associated with a plurality of fabric attach-capable devices. In some implementations, the instructions further cause the one or more processors to perform operations including detecting the ONA being disconnected from a different switch.

In some implementations, a non-transitory computer-readable storage medium includes program instructions stored thereon. The instructions when executed by one or more processors cause the one or more processors to perform operations including receiving, by an SDN controller, a notification of an ONA establishing a connection with a switch, the ONA having an address associated therewith; identifying the switch based on a lookup of the address of the ONA in forwarding tables of a neighboring switch of the SDN controller; and applying a service profile configuration to a port of the switch where the ONA is connected.

With further regard to the computer-readable storage medium, in some implementations, the identifying of the switch is performed two or more times. In some implementations, the instructions when executed are further operable to perform operations comprising searching a lookup table in a topology table of the switch. In some implementations, the ONA is part of an IoT device. In some implementations, the ONA is part of a fabric attach-capable device coupled to a medical device. In some implementations, the forwarding tables include information associated with a plurality of fabric attach-capable devices.

DETAILED DESCRIPTION

Implementations described herein relate to discovery of a connection between an open networking adapter (ONA) and a switch, and validation of the ONA.

As described in more detail herein, in various implementations, a system such as an software-defined network (SDN) controller receives a notification of an ONA establishing a connection with a switch. The SDN controller also identifies the switch based on a lookup of the address of the ONA in forwarding tables of a neighboring switch of the SDN controller. The SDN controller also applies a service profile configuration to a port of the switch where the ONA is connected.

Figure 1:
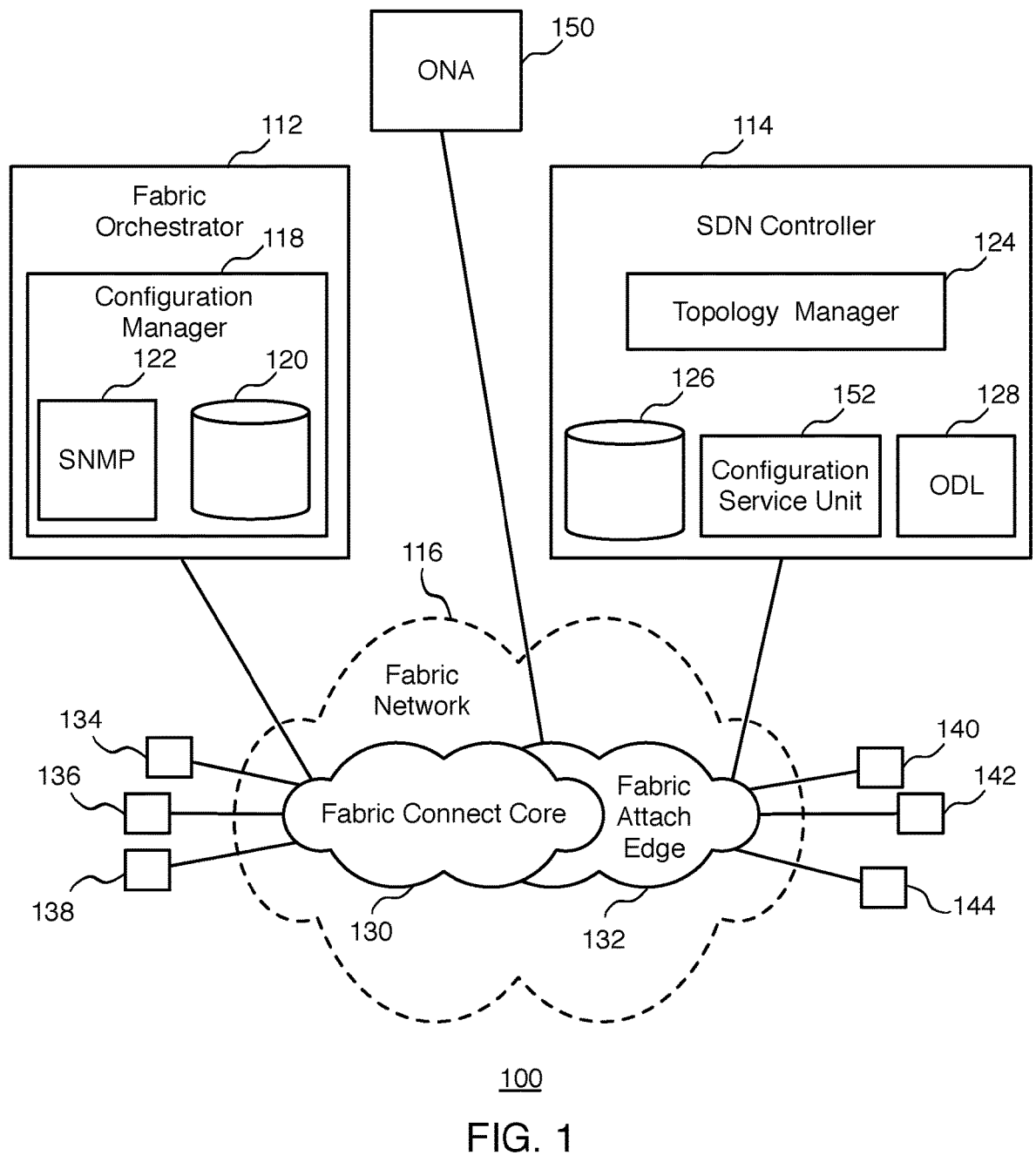
FIG. 1 illustrates a block diagram of an example fabric network system for discovery of an open network adapter, according to some implementations.

FIG. 1 illustrates a block diagram of an example fabric network system 100 for discovery of an ONA, according to some implementations. In some implementations, fabric network system 100 includes a fabric orchestrator 112, an SDN controller 114, and a fabric network 116. Fabric orchestrator 112 includes a configuration and orchestration manager 118, or configuration manager 118, which includes a database 120 and a simple network management protocol (SNMP) module 122. SDN controller 114 includes a topology manager 124, a database 126, and an open daylight (ODL) controller 128.

In various implementations, fabric network 116 includes a fabric connect core 130 and a fabric attach edge 132. Fabric connect core 130 may include various network equipment 134, 136, and 138. Such network equipment may include, for example, network controllers, network management devices, application servers, fabric attach servers, etc.

In various implementations, fabric attach edge 132 includes various fabric attach clients 140, 142, and 144. Such fabric attach clients may include, for example, fabric attach proxies that connect to fabric attach servers, etc.

In various implementations, fabric network system 100 may not have all of the components shown and/or may have other elements including other types of components instead of, or in addition to, those shown herein. For example, in some implementations, fabric attach edge 132 may include any number of fabric attach proxies and fabric attach clients, etc. Also, in some implementations, fabric connect core may include any number of SDN controllers, network management devices, fabric attach servers, application servers, etc.

In various implementations, SDN controller 114 is communicatively coupled to the fabric network 116. In some implementations, fabric attach edge 132 is a part of an ONA that is attached to fabric connect core 130 through a connection between a fabric attach proxy and fabric attach servers. In various implementations, SDN controller 114 may be in communication with a fabric attach client (e.g., fabric attach client 140, 142, or 144, etc.) of fabric attach edge 132.

In various implementations, fabric attach edge 132 is employed with medical devices. For example, fabric attach clients 140, 142, and 144 may be communicatively coupled with infusion pumps, magnetic resonance imaging (MRI) equipment, monitors, etc.

In some implementations, when fabric attach edge 132 connects with fabric connect core 130, one or more of fabric attach clients 140, 142, and 144 may be connected through a fabric attach proxy to a port of the fabric connect core 130, such as the fabric attach servers.

In some implementations, topology manager 124 of SDN controller 114 may communicate with configuration manager 118 of fabric orchestrator 112.

In some implementations, a fabric attach proxy is communicatively coupled to each server of the fabric attach servers and to the fabric attach clients. In some implementations, the fabric attach clients are communicatively coupled to the fabric attach servers.

Topology manager 124 manages the topology of fabric network 116 by the use of one or more processors, may employ one or more lookup tables, and may forward one or more lookup tables stored in database 126.

In various implementations, ODL 128 provides a model-driven service abstraction platform that allows users to write apps that work across a wide variety of hardware and south-bound protocols. In various implementations, ODL 128 performs deployment for the SDN controller 114 and facilitates communication between SDN controller 114 and fabric attach edge 132 through an open flow connection.

In some implementations, topology manager 124 communicates with fabric orchestrator 112. SNMP 122 communicates with fabric network 116 using SNMP 122. SNMP module 122 of the fabric orchestrator 112 couples fabric orchestrator 112 to fabric network 116. In some implementations, ONA 150 may be part of an IoT device.

In operation, ONA 150 may be identified as follows. Fabric orchestrator 112 obtains the topology of the fabric network 116 and the topology manager 124 obtains details of ONA 150, such as its forwarding tables and information defining its physical connection that are stored in database 126. The physical connection of ONA 150 may be obtained by fabric orchestrator 112 from the topology manager 124. In some implementations, topology manager 124 ultimately stitches ONA 150 with fabric network 116.

The application servers as a switch connecting/disconnecting the fabric attach edge 132 to fabric connect core 130. Fabric attach edge 132 physically connects or disconnects through one of the ports of a fabric attach proxy.

Identifying the connection of between ONA 150 with the switch of the fabric connect core 130 is generally as follows. First, a notification of ONA 150 establishing a connection with the switch is received, where the ONA 150 has an associated address. Upon receipt of the notification, the switch is identified based on an address lookup table with forwarding tables of a neighboring switch. A service profile configuration is applied to a port of the switch where ONA 150 is connected.

More specifically, a notification is sent by ONA 150 to ODL 128 of the topology manager. Topology manager 124 captures the notification from ODL 128 and looks out for a switch neighboring the fabric switch by maintaining each of their ONA media access control (MAC) entries from respective forwarding tables that are stored in the database 126. The MAC entries may also be used to look for potential duplicates when validating ONA 150. That is, a match of ONA 150 MAC entries yields false identification of ONA 150.

Topology manager 124 includes a topology table with forwarding tables (also referred to as lookup tables) of fabric attach-capable devices, such as ONA 150. That is, topology manager 124 searches the lookup table of the topology table of the switch to eliminate the possibility of duplicate identifications. This is discussed in further detail below.

Topology manager 124 identifies ONA 150, through its switch, more than once, as yet another measure of validating ONA 150. The forwarding table is routinely refreshed and during a refresh cycle, the ONA MAC entry being searched may be missing from the forwarding table during a refresh cycle.

Therefore, the forwarding table is sampled multiple times to eliminate the possibility of a missing ONA MAC entry. Additional lookup of the topology table is performed so as to eliminate duplicate ONA MAC entries. The ONA 150 MAC entry in the forwarding table of all switches that are adjacent (or neighbors) to the switch is compared to the ONA MAC entry of the switch to look for a match because upon the detection of a match, ONA 150 is not validated. This is yet another measure of validating ONA 150.

In some implementations, through the use of ODL 128, topology manager 124 may apply a service profile configuration to the port of the switch where ONA 150 is connected. After the discovery and validation of ONA 150, topology manager 124 updates the configuration status on a topology user interface (UI) to provide an overall status of the configuration to a user of the fabric network system 100.

Topology manager 124 fetches data relating to ONA 150 from ODL 128 and fabric network 116 and stitches the fetched data to obtain the connectivity information relating to the connection of ONA 150 with fabric network 116. Therefore, a unified view of an ONA 150 connection to fabric network 116 is provided. Further, as previously discussed in detail, topology manager 124 detects any anomaly, using the forwarding table as discussed above, of the fabric attach assignment between a fabric attach client, such as fabric attach edge 132 and fabric network 116. Accordingly, troubleshooting is enhanced because of multiple sources for stitching the data.

In accordance with some implementations, a fabric attach-capable device, such as the fabric attach client 140, is coupled to a medical device, such as an infusion pump and in this respect acts as an intelligent network node for the medical device.

In some implementations, ONA 150 replaces exchanging network traffic through the switch, after the service profile configuration is applied. The notification is received via an open flow protocol, and exchanging the network traffic is performed via fabric network 116.

In some implementations, fabric network system 100 may include a configuration service unit 152 that houses the configuration service profile of fabric network 116.

As described in more detail herein, in various implementations, when topology manager 124 discovers an ONA, topology manager 124 fetches the network topology from configuration manager 118. Topology manager 124 also fetches details of ONA 150 from database 126. Topology manager 124 also determines the physical connection of ONA 150 from a forwarding table, and eliminates duplicates by using an auto topology table. Topology manager 124 then links or stitches ONA 150 with fabric network 116.

As described in more detail herein, in various implementations, to validate the status of ONA 150, upon the connection of ONA 150 to the fabric connect core 130, as detected by topology manager 124, fabric orchestrator 112 retrieves the forwarding table of ONA 150. In some implementations, ONA 150 details, such as the forwarding table, are retrieved and ODL 128 communicates the new mapping of the fabric attach network configuration (e.g., the network configuration of fabric attach edge 132) to fabric attach core 130. In some implementations, configuration manager 118 of fabric orchestrator 112 fetches the new mapping status of the fabric attach network configuration of the switch from topology manager 124. In real-time, configuration manager 118 updates the topology status accordingly.

In various implementations, fabric network system 100 may not have all of the components shown and/or may have other elements including other types of components instead of, or in addition to, those shown herein.

Figure 2:
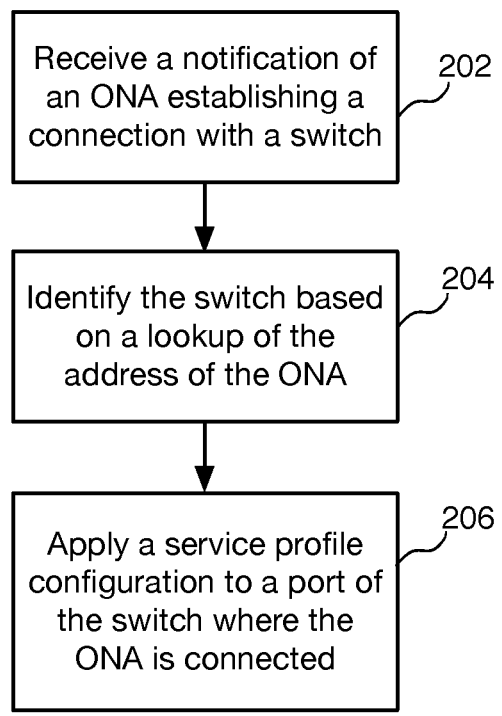
FIG. 2 illustrates example flow diagram for host discovery and attach, according to some implementations.

FIG. 2 illustrates example flow diagram for host discovery and attach, according to some implementations. Referring to both FIGS. 1 and 2, a method is initiated in block 202, where a system such as SDN controller 114 receives a notification of an ONA establishing a connection with a switch, the ONA having an address associated therewith.

In block 204, upon receiving the notification, SDN controller 114 identifies the switch based on a lookup of the address of the ONA in forwarding tables of a neighboring switch of the SDN controller. In some implementations, SDN controller 114 identifies the switch two or more times. In some implementations, SDN controller 114 identifies the switch two or more times prior to applying the service profile configuration. In some implementations, SDN controller 114 identifies the switch two or more times prior to applying the service profile configuration in order to avoid missing addresses in the lookup during refresh cycles. In some implementations, SDN controller 114 searches a lookup table in a topology table of the switch in order to eliminate duplicate identifications based on the topology table. In some implementations, the forwarding tables include information associated with multiple fabric attach-capable devices. In some implementations, the ONA is part of an IoT device.

In block 204, SDN controller 114 applies a service profile configuration to a port of the switch where the ONA is connected. As described in more detail herein, in some implementations, the ONA is part of a fabric attach-capable device coupled to a medical device. In some implementations, the fabric attach-capable device functions as an intelligent network node for the medical device.

In some implementations, SDN controller 114 further detects the ONA being disconnected from a different switch. In some implementations, SDN controller 114 detects the ONA being disconnected from a different switch prior to receiving the notification. In some implementations, SDN controller 114 updates a configuration status in a topology manager of SDN controller 114, and provides a topology user interface including the configuration status.

In some implementations, SDN controller 114 exchanges network traffic with the ONA through the switch. In some implementations, SDN controller 114 exchanges network traffic with the ONA through the switch after the service profile configuration is applied.

In some implementations, SDN controller 114 receives the notification via an open flow protocol, and wherein exchanging the network traffic is performed via a fabric attach fabric attaché network.

Figure 3:
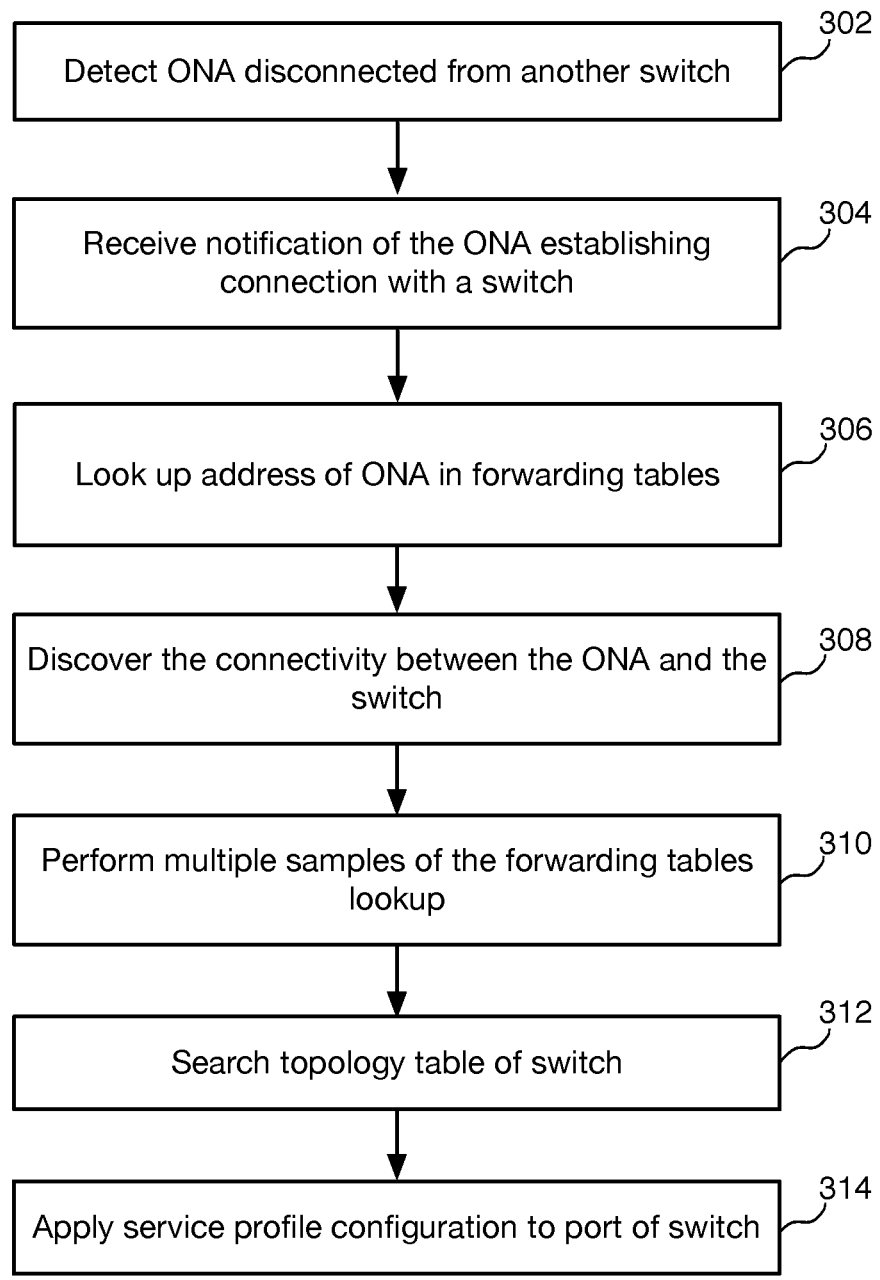
FIG. 3 illustrates example flow diagram for host discovery and attach, according to some implementations.

FIG. 3 illustrates example flow diagram for host discovery and attach, according to some implementations. Referring to both FIGS. 1 and 3, a method is initiated in block 302, where topology manager 124 optionally detects the status of ONA 150 as being disconnected from other switches in fabric network 116.

In block 304, topology manager 124 receives notification, from ODL 128, that ONA 150 has established connection with the switch or servers, as discussed above, and keeps a lookout for a neighbor switch.

In block 306, upon receiving the notification, topology manager 124 looks up or searches for the address of ONA 150 in the forwarding tables, which are stored in database 24.

In block 308, topology manager 124 discovers the connectivity between ONA 150 and the switch by searching the ONA MAC entry in the forwarding tables of the fabric attach-capable devices that are available in the fabric network.

In block 310, to validate the discovered ONA, topology manager 124 performs multiple samples of the forwarding table lookup, similar to that which was done at step 306. This is to eliminate the case of missing the ONA MAC entry due to continuous forwarding table refresh cycles, as noted in earlier discussions above.

In block 312, another validation step is performed where the topology table of the switch is searched so as to eliminate the case where the ONA MAC entry is available in forwarding tables of all adjacent switches. This is done in the event that the ONA MAC entry is available in any of the adjacent switches.

In block 314, in some implementations, assuming the validation blocks 310 and 312 are successfully performed, ODL 128 applies the service profile configuration (e.g., stored in the database 126) to the port of the switch to which ONA 150 is physically connected. ODL 128 also updates the configuration status of fabric network 116 and provides the overall status of the fabric network to the topology user interface of a user device for viewing by the user.

Implementations described herein provide various benefits. For example, implementations provide easy, reliable, and efficient detection of devices coupled to networks using ONA, which facilitates operation and management of such networks.

Figure 4:
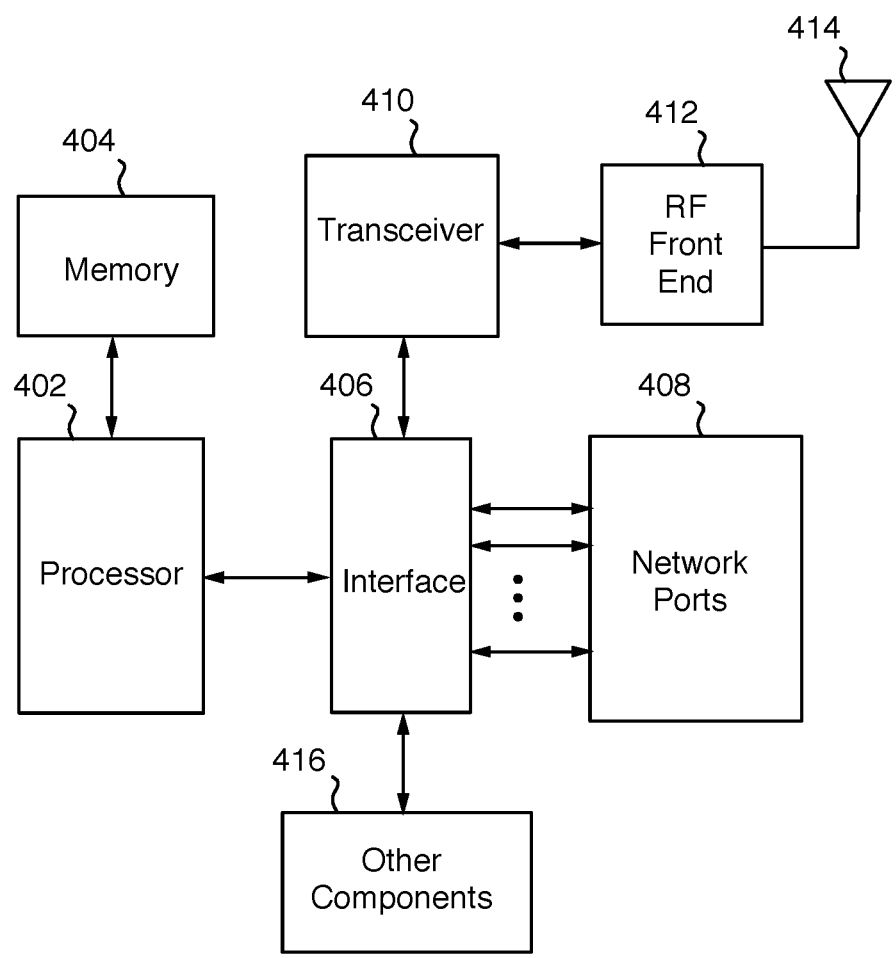
FIG. 4 illustrates a block diagram of an example device, according to some implementations.

FIG. 4 illustrates a block diagram of an example device 400, according to some implementations. Device 400 may be used for various implementations described herein. Device 400 may be, for example, a wireless controller such a processor 402.

Depending on the desired configuration, processor 402 may be of any type of processing circuitry including but not limited to one or more microprocessors, microcontrollers, digital signal processors (DSPs), application specific integrated circuits (ASICs), or any combination thereof. In some examples, processor 402 may include one or more levels of caching, a processor core, and registers. An example processor core may include an arithmetic logic unit (ALU), a floating-point unit (FPU), a digital signal processing core (DSP), or any combination thereof. A memory controller can also be used with processor 402, or, in some implementations, a memory controller can be an internal part of processor 402.

A memory 404 may store data used in the operation of the device 400. For example, an example implementation, device 400 may be a controller device, and system memory 404 may store an operating system for the controller device, one or more applications for the controller device, and program data. In some implementations, memory 404 may store software operative to perform network device functionality as well as read the instructions sent by an administrator or other user to the device and perform other functions as described above, including reading and executing commands and parameters, receiving information from associated wireless access points, and performing blocks of methods described herein using one or more processors. For example, edge device profiles providing configurations for edge devices, and/or software images and/or parameters for sending to be installed on edge devices may be stored in memory 404. Furthermore, a signal coverage map can be stored in memory 404 representing the wireless coverage of associated edge devices in the network. Alternatively, the software may be implemented as hardware or a combination of hardware and software. Memory 404 may be implemented as one or more of various types, volatile and/or non-volatile, including random access memory (RAM), read-only memory (ROM), electrically erasable programmable read-only memory (EEPROM), flash memory or other memory technology, etc.

An interface 406 may be used to interface processor 402 with other functional components of the device 400. Such other components may include network ports 408 of device 400, where network ports 408 are connected to other devices on the network to enable communication of data to and from other network devices. For example, Ethernet, universal serial bus (USB), or other types of ports may allow wired network communication to device 400.

A transceiver 410 may be connected to interface 406 to enable transmission and reception of wireless signals at device 400. For example, a radio frequency (RF) front end 412 and an antenna 414 may enable transmission and reception of wireless RF signals, as well as conversion between analog signals used in wireless communication and digital signals used by device 400. Signals of other frequencies may be communicated in other implementations.

Other components 416 may also be connected to interface 406. For example, storage devices may be connected to interface 406, such as a compact disc ROM (CD-ROM), digital video disc (DVD), or other optical storage, magnetic tape storage, magnetic disk storage or other magnetic storage devices, solid state memory storage, or any other medium which can be used to store the desired information and which can be accessed by device 400. Any such computer storage media (including memory 404) may be part of or accessible by device 400. Example computer storage media can include volatile and nonvolatile, removable and non-removable media implemented in any method or technology for storage of information, such as computer readable instructions, data structures, program modules, or other data.

In various implementations, device 400 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the embodiments may be implemented using a general purpose or dedicated processor running a software application through volatile or non-volatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable non-transitory processor-readable storage medium, such as random-access memory (RAM), read-only memory (ROM), magnetic or optical disk, or other tangible media suitable for storing instructions for execution by the processor.

Particular embodiments may be implemented by using a programmable general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
receiving, by a software-defined network (SDN) controller, a notification of an open networking adapter (ONA) establishing a connection with a first switch associated with a fabric connect core, the ONA having an address associated therewith;
identifying the connection of the ONA to the first switch based on a lookup of the address of the ONA in media access entries (MAC) of fabric-attach capable devices in forwarding tables of a second switch, neighboring the first switch of the SDN controller, wherein the identifying comprises identifying a port of the first switch that the ONA is connected to; and
applying a service profile configuration to the port of the first switch that the ONA is connected to.

2. The method of claim 1, wherein the forwarding tables of the second switch are refreshed periodically and wherein the lookup of the address of the ONA is performed two or more times, wherein a first lookup is performed at a first time and a second lookup is performed at a second time, wherein at least one refresh of the forwarding tables takes place between the first time and the second time.

3. The method of claim 1, further comprising searching a lookup table in a topology table of the first switch to eliminate duplicate identification of the ONA.

4. The method of claim 1, wherein the ONA is part of an Internet-of-Things (IoT) device.

5. The method of claim 1, wherein the ONA is part of a fabric attach-capable device coupled to a medical device.

6. The method of claim 1, wherein the forwarding tables include information associated with a plurality of fabric attach-capable devices.

7. The method of claim 1, further comprising detecting the ONA being disconnected from a different switch.

8. The method of claim 1, further comprising, after applying the service profile configuration:
updating the configuration status of a fabric network that includes the fabric connect core; and
providing the updated configuration status of the fabric network to a topology user interface of a user device.

9. The method of claim 1, wherein the notification is received via an open flow protocol and network traffic is exchanged via a simple network management protocol (SNMP).

10. A system comprising:
a memory with program instructions stored thereon; and
one or more hardware processors coupled to the memory, the one or more hardware processors configured to access the memory and execute the program instructions stored thereon that, when executed by the one or more hardware processors, cause the one or more hardware processors to perform operations comprising:
receiving, by a software-defined network (SDN) controller, a notification of an open networking adapter (ONA) establishing a connection with a first switch associated with a fabric connect core, the ONA having an address associated therewith;
identifying the connection of the ONA to the first switch based on a lookup of the address of the ONA in media access entries (MAC) of fabric-attach capable devices in forwarding tables of a second switch, neighboring the first switch of the SDN controller, wherein the identifying comprises identifying a port of the first switch that the ONA is connected to; and
applying a service profile configuration to the port of the first switch that the ONA is connected to.

11. The system of claim 10, wherein the forwarding tables of the second switch are refreshed periodically and wherein the lookup of the address of the ONA is performed two or more times, wherein a first lookup is performed at a first time and a second lookup is performed at a second time, wherein at least one refresh of the forwarding tables takes place between the first time and the second time.

12. The system of claim 10, wherein the program instructions further cause the one or more hardware processors to perform operations including searching a lookup table in a topology table of the first switch to eliminate duplicate identification of the ONA.

13. The system of claim 10, wherein the ONA is part of an Internet-of Things (IoT) device.

14. The system of claim 10, wherein the ONA is part of a fabric attach-capable device coupled to a medical device.

15. The system of claim 10, wherein the forwarding tables include information associated with a plurality of fabric attach-capable devices.

16. The system of claim 10, wherein the program instructions further cause the one or more hardware processors to perform operations including detecting the ONA being disconnected from a different switch.

17. A non-transitory computer-readable storage medium with program instructions stored thereon, the program instructions when executed by one or more hardware processors cause the one or more hardware processors to perform operations comprising:
receiving, by a software-defined network (SDN) controller, a notification of an open networking adapter (ONA) establishing a connection with a first switch associated with a fabric connect core, the ONA having an address associated therewith;
identifying the connection of the ONA to the first switch based on a lookup of the address of the ONA in media access entries (MAC) of fabric-attach capable devices in forwarding tables of a second switch, neighboring the first switch of the SDN controller, wherein the identifying comprises identifying a port of the first switch that the ONA is connected to; and
applying a service profile configuration to the port of the first switch that the ONA is connected to.

18. The computer-readable medium of claim 17, wherein the forwarding tables of the second switch are refreshed periodically and wherein the lookup of the address of the ONA is performed two or more times, wherein a first lookup is performed at a first time and a second lookup is performed at a second time, wherein at least one refresh of the forwarding tables takes place between the first time and the second time.

19. The computer-readable medium of claim 17, wherein the program instructions when executed are further operable to perform operations comprising searching a lookup table in a topology table of the first switch to eliminate duplicate identification of the ONA.

20. The computer-readable medium of claim 17, wherein the forwarding tables include information associated with a plurality of fabric attach-capable devices.

\* \* \* \* \*